(12) United States Patent
Albers et al.

(10) Patent No.: US 11,440,385 B2
(45) Date of Patent: Sep. 13, 2022

(54) OPEN ROOF CONSTRUCTION FOR A VEHICLE

(71) Applicant: Inalfa Roof Systems Group B.V., Oostrum (NL)

(72) Inventors: Thomas Anton Martijnszoon Albers, Venray (NL); Stephan Christiaan Vervoort, Boxmeer (NL); Petrus Antonius Wesseling, Nijmegen (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 16/635,067

(22) PCT Filed: Aug. 3, 2017

(86) PCT No.: PCT/EP2017/069674
§ 371 (c)(1),
(2) Date: Jan. 29, 2020

(87) PCT Pub. No.: WO2019/024996
PCT Pub. Date: Feb. 7, 2019

(65) Prior Publication Data
US 2021/0138882 A1 May 13, 2021

(51) Int. Cl.
*B60J 7/043* (2006.01)
*B60J 7/02* (2006.01)
*B60J 7/057* (2006.01)

(52) U.S. Cl.
CPC ............ *B60J 7/0435* (2013.01); *B60J 7/024* (2013.01); *B60J 7/022* (2013.01); *B60J 7/0573* (2013.01)

(58) Field of Classification Search
CPC ........ B60J 7/043; B60J 7/0573; B60J 7/0435; B60J 7/047; B60J 7/05; B60J 7/53; B60J 7/022; B60J 7/024

(Continued)

(56) References Cited

U.S. PATENT DOCUMENTS 4,407,541 A 10/1983 Boots
4,417,763 A 11/1983 Schlapp et al.
(Continued)

FOREIGN PATENT DOCUMENTS

DE 3442600 A1 5/1986
DE 3510759 A1 9/1986
(Continued)

OTHER PUBLICATIONS

Harada et al. and Nippondenso Co., "A power supply device of open-close self-propelled apparatus", Jun. 12, 1996, Japanese Patent Office, JP2507535B (Year: 1996).*
(Continued)

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

An open roof construction for a vehicle having at least one opening in the fixed roof, includes a stationary part for attachment to the roof. It carries at least two guide rails alongside the roof opening. At least one closure having a front and a rear side is supported by an operating mechanism guided on the guide rails. The closure is adjustable between a closed position, in which it closes the roof opening, and an open position in which it is at least partly moved out of the roof opening. The operating mechanism includes at least one first support member adjustably supporting the closure near its front side, and at least adjustable second support members adjustably supporting the closure a distance behind the front side. Each support member includes two separate drive sources to be able to adjust each support member independently in horizontal and vertical direction.

20 Claims, 9 Drawing Sheets

(58) Field of Classification Search
USPC .................. 296/216.01, 216.02, 216.03
See application file for complete search history.

(56) References Cited

U.S. PATENT DOCUMENTS

| | | | |
|---|---|---|---|
| 4,602,815 A | 7/1986 | Boots | |
| 4,619,480 A | 10/1986 | Motoyama et al. | |
| 4,630,859 A | 12/1986 | Blenert et al. | |
| 4,647,104 A | 3/1987 | Kohlpaintner et al. | |
| 4,647,106 A | 3/1987 | Furst | |
| 4,650,243 A | 3/1987 | Hanley | |
| 4,671,565 A | 6/1987 | Grimm et al. | |
| 4,679,846 A | 7/1987 | Lux et al. | |
| 4,684,169 A | 8/1987 | Igel et al. | |
| 4,685,724 A | 8/1987 | Niwa | |
| 4,690,452 A | 9/1987 | Niwa | |
| 4,690,453 A | 9/1987 | Niwa | |
| 4,699,421 A | 10/1987 | Schaetzier et al. | |
| 4,725,092 A | 2/1988 | Reintges et al. | |
| 4,730,868 A | 3/1988 | Niwa | |
| 4,741,573 A | 5/1988 | Yokota | |
| 4,746,165 A | 5/1988 | Fuerst | |
| 4,752,099 A | 6/1988 | Roos et al. | |
| 4,779,920 A | 10/1988 | Alfonso | |
| 4,877,285 A | 10/1989 | Huyer | |
| 4,911,497 A | 3/1990 | Schreiter et al. | |
| 4,923,246 A | 5/1990 | Takahashi et al. | |
| 4,978,165 A | 12/1990 | Schreiter et al. | |
| 4,984,332 A | 1/1991 | Bienert et al. | |
| 4,995,665 A | 2/1991 | Ichinose et al. | |
| 4,995,667 A | 2/1991 | Tamura et al. | |
| 5,020,849 A | 6/1991 | Schlapp et al. | |
| 5,026,113 A | 6/1991 | DiCarlo et al. | |
| 5,028,090 A | 7/1991 | Huyer | |
| 5,058,947 A | 10/1991 | Huyer | |
| 5,066,068 A | 11/1991 | Suzuki et al. | |
| 5,069,501 A | 12/1991 | Baldwin et al. | |
| 5,154,482 A | 10/1992 | Hayashi et al. | |
| 5,238,290 A | 8/1993 | Farmont | |
| 5,259,662 A | 11/1993 | Huyer | |
| 5,288,125 A | 2/1994 | Huyer | |
| 5,447,355 A | 9/1995 | Kelm | |
| 5,464,267 A | 11/1995 | Racine et al. | |
| 5,527,085 A | 6/1996 | Ochiai et al. | |
| 5,531,501 A | 7/1996 | Nabuurs | |
| 5,593,204 A | 1/1997 | Wahl et al. | |
| 5,618,081 A | 4/1997 | Nabuurs | |
| 5,632,523 A | 5/1997 | Kelm | |
| 5,707,102 A | 1/1998 | Takahashi et al. | |
| 5,746,475 A | 5/1998 | Caye et al. | |
| 5,765,907 A | 6/1998 | Nabuurs | |
| 5,765,908 A | 6/1998 | Kelm | |
| 5,845,959 A | 12/1998 | Ueki | |
| 5,951,100 A * | 9/1999 | Ewing .................. | B60J 7/047 |
| | | | 296/214 |
| 5,971,473 A | 10/1999 | Kelm | |
| 6,012,768 A | 1/2000 | Nabuurs et al. | |
| 6,129,413 A | 10/2000 | Klein | |
| 6,158,803 A | 12/2000 | Reihl et al. | |
| 6,199,944 B1 | 3/2001 | Lee et al. | |
| 6,224,147 B1 | 5/2001 | Farber et al. | |
| 6,257,658 B1 | 7/2001 | Nabuurs et al. | |
| 6,390,545 B1 | 5/2002 | Makino et al. | |
| 6,416,122 B1 | 7/2002 | Schwarz et al. | |
| 6,419,309 B1 | 7/2002 | Kaandorp et al. | |
| 6,454,347 B2 | 9/2002 | Lee et al. | |
| 6,494,529 B1 | 12/2002 | Manders | |
| 6,527,337 B2 | 3/2003 | Farber | |
| 6,550,853 B2 | 4/2003 | Wingen et al. | |
| 6,568,750 B2 | 5/2003 | Radmanic et al. | |
| 6,572,183 B2 | 6/2003 | Wingen et al. | |
| 6,619,732 B2 | 9/2003 | Radmanic | |
| 6,652,022 B2 | 11/2003 | Pfalzgraf et al. | |
| 6,805,402 B2 | 10/2004 | Pfalzgraf | |
| 6,942,285 B2 | 9/2005 | Manders et al. | |
| 7,178,862 B2 | 2/2007 | Oechel | |
| 7,828,376 B2 | 11/2010 | Nellen | |
| 7,850,231 B2 | 12/2010 | Ito et al. | |
| 7,878,581 B2 | 2/2011 | Faerber et al. | |
| 8,136,872 B2 | 3/2012 | Nellen | |
| 8,857,903 B2 | 10/2014 | Nellen et al. | |
| 8,870,276 B2 | 10/2014 | Geurts et al. | |
| 8,991,911 B2 | 3/2015 | Nabuurs et al. | |
| 9,227,493 B2 | 1/2016 | Nellen et al. | |
| 9,415,665 B2 | 8/2016 | Nellen | |
| 2002/0014531 A1 | 2/2002 | Murphy et al. | |
| 2002/0016322 A1 | 2/2002 | Bandarage et al. | |
| 2005/0021870 A1 | 1/2005 | Carnahan et al. | |
| 2005/0023100 A1 | 2/2005 | Buchholz | |
| 2005/0218704 A1 | 10/2005 | Uehara et al. | |
| 2005/0231007 A1 | 10/2005 | Oechel | |
| 2007/0011481 A1 | 1/2007 | Kwack et al. | |
| 2007/0114817 A1 | 5/2007 | Becher et al. | |
| 2009/0017946 A1 | 1/2009 | Nally | |
| 2009/0039682 A1 | 2/2009 | Ito et al. | |
| 2009/0072589 A1 | 3/2009 | Ito et al. | |
| 2009/0134672 A1 * | 5/2009 | Hirata .................. | B60J 7/043 |
| | | | 296/223 |
| 2009/0179462 A1 | 7/2009 | Nellen | |
| 2010/0164253 A1 | 7/2010 | Faerber et al. | |
| 2011/0037295 A1 | 2/2011 | Nellen | |
| 2013/0082489 A1 | 4/2013 | Gruss et al. | |
| 2013/0161983 A1 | 6/2013 | Geurts et al. | |
| 2013/0187412 A1 | 7/2013 | Nellen et al. | |
| 2014/0175840 A1 | 6/2014 | Nabuurs et al. | |
| 2015/0336448 A1 | 11/2015 | Nellen | |

FOREIGN PATENT DOCUMENTS

| | | |
|---|---|---|
| DE | 3536184 C1 | 11/1986 |
| DE | 3532111 A1 | 3/1987 |
| DE | 3603314 A1 | 8/1987 |
| DE | 3802380 A1 | 8/1988 |
| DE | 3920372 C1 | 8/1990 |
| DE | 3930756 A1 | 3/1991 |
| DE | 4101288 A1 | 7/1991 |
| DE | 9116421 U1 | 11/1992 |
| DE | 9116412 U1 | 12/1992 |
| DE | 9302762 U1 | 4/1993 |
| DE | 4238945 C1 | 11/1993 |
| DE | 4227400 A1 | 2/1994 |
| DE | 4405742 C1 | 5/1995 |
| DE | 19514585 A1 | 10/1996 |
| DE | 19609188 C1 | 4/1997 |
| DE | 19635145 C1 | 10/1997 |
| DE | 19713347 C1 | 5/1999 |
| DE | 19851366 A1 | 5/1999 |
| DE | 10348545 A1 | 5/2005 |
| DE | 102004018461 A1 | 11/2005 |
| DE | 102005007031 | 8/2006 |
| DE | 102005030056 B3 | 8/2006 |
| DE | 102005058007 A1 | 6/2007 |
| DE | 102007003177 A1 | 7/2008 |
| DE | 102007004258 A1 | 7/2008 |
| EP | 0033816 A1 | 8/1981 |
| EP | 0143589 A2 | 6/1985 |
| EP | 0182431 A1 | 5/1986 |
| EP | 0218890 A1 | 4/1987 |
| EP | 0292730 A2 | 11/1988 |
| EP | 0296644 A2 | 12/1988 |
| EP | 0331910 A2 | 9/1989 |
| EP | 0343750 A1 | 11/1989 |
| EP | 0373692 A2 | 6/1990 |
| EP | 0381066 A2 | 8/1990 |
| EP | 0403388 A1 | 12/1990 |
| EP | 0437283 A1 | 7/1991 |
| EP | 0517318 A1 | 12/1992 |
| EP | 0543427 A1 | 5/1993 |
| EP | 0657316 A1 | 6/1995 |
| EP | 0747249 A1 | 12/1996 |
| EP | 0899140 A1 | 3/1999 |
| EP | 1052126 A1 | 11/2000 |
| EP | 1314600 A1 | 5/2003 |
| EP | 1741588 A1 | 1/2007 |

(56) References Cited

FOREIGN PATENT DOCUMENTS

| EP | 1790515 | A1 |   | 5/2007  |            |
|----|---------|----|---|---------|------------|
| EP | 2028031 | A2 |   | 2/2009  |            |
| EP | 2078630 | A1 |   | 7/2009  |            |
| EP | 2554415 | A1 |   | 2/2013  |            |
| EP | 2727755 | A1 |   | 5/2014  |            |
| EP | 2946956 | A1 |   | 11/2015 |            |
| FR | 2495068 | A1 |   | 6/1982  |            |
| FR | 2527995 | A1 |   | 12/1983 |            |
| FR | 2726512 | A1 |   | 5/1996  |            |
| GB | 2078295 | A  |   | 1/1982  |            |
| GB | 2204837 | A  | * | 11/1988 | ............... B60J 5/14 |
| GB | 2241205 | A  | * | 8/1991  | ............. B60J 7/042 |
| JP | 59156820 | A |   | 9/1984  |            |
| JP | 2507535 | B2 | * | 6/1996  | ........... E05F 15/697 |
| KR | 92008091 | B1 |   | 9/1992  |            |
| NL | 1014023 | C2 |   | 7/2001  |            |
| WO | 2006086955 | A1 |  | 8/2006  |            |
| WO | 2007079747 | A1 |  | 7/2007  |            |
| WO | 2008049407 | A2 |  | 5/2008  |            |
| WO | 2009109219 | A1 |  | 9/2009  |            |

OTHER PUBLICATIONS

International Search Report, dated Apr. 11, 2018, for corresponding International Patent Application No. PCT/EP2017/069674, filed Aug. 3, 2017.

Written Opinion of the International Searching Authority, dated Apr. 11, 2018, for corresponding International Patent Application No. PCT/EP2017/069674, filed Aug. 3, 2017.

* cited by examiner

OPEN ROOF CONSTRUCTION FOR A VEHICLE

CROSS-REFERENCE TO RELATED APPLICATION

The present application is a national stage of and claims priority of International patent application Serial No. PCT/EP2017/069674, filed Aug. 3, 2017, and published in English as WO 2019/024996.

BACKGROUND

The discussion below is merely provided for general background information and is not intended to be used as an aid in determining the scope of the claimed subject matter.

The present invention relates to an open roof construction for a vehicle having at least one opening in a fixed roof. The open roof construction includes a stationary part for attachment to the fixed roof, carrying at least two guide rails alongside the roof opening. At least one closure having a front and a rear side and being supported by an operating mechanism is guided by the guide rails. The closure is adjustable between a closed position, in which it closes the roof opening, and an open position in which it is at least partly moved out of the roof opening. The operating mechanism includes on each guide rail at least one adjustable first support member adjustably supporting the closure near its front side, and at least one adjustable second support member adjustably supporting the closure a distance behind the front side.

Such an open roof construction is described for example in EP 2 554 415 A1. In such open roof construction, the operating mechanism must be designed specifically for every type of vehicle.

SUMMARY

In the afore-mentioned open roof construction at least one of the first and second support members includes two separate drive sources to be able to adjust the at least one of the first and second support members independently in horizontal and vertical direction. By providing at least one of the first and second support members with a separate drive source for the horizontal and vertical movements, it is possible to use the same operating mechanism for different types of vehicles or different types of roofs. Only a controller for the drive sources should be different or only the software of a programmable controller should be changed to allow the support members to make the required horizontal and vertical movements for a particular type of vehicle or specific type of open roof construction. This means that mechanical parts of the operating mechanism could be the same in different types of roofs which makes design and manufacture less complicated.

Although the first support member(s) could be just a pivot, it is preferred to provide the first support member with at least a drive source for its adjustment in horizontal direction, but most preferable also with a drive source for adjustment in vertical direction, so that all kind of movements of the front side of the closure are possible.

If a support member is adjustable in vertical direction, it will always have its own drive source for the vertical adjustment. The vertical adjustment of the second support member is preferably completely independent of the vertical position of the first support member. However, two or more support members may have a common drive source for the horizontal adjustment so that they make the same horizontal movement. However, it is also possible to include a coupling between a support member and the drive source for the horizontal adjustment, allowing one support member to move horizontally with respect to the other. The first and/or second support members in the two guide rails may be coupled to a common drive source through one or two connecting elements.

The vertical adjustment of the support members may be accomplished by relatively simple mechanical mechanism, such as a lever mechanism, a screw jack, and/or a pin-slot mechanism. The connecting element for horizontal adjustment includes one of a belt, push-pull cable, rack and pinion and the like.

The drive source for the horizontal adjustment of a respective support member may be mounted stationary and be connected to the support member by said connecting element(s), or may move along with it and be engaged with the stationary part to drive the support member. The drive source may for example carry a pinion engaging a stationary rack.

An aspect of the invention also includes an operating mechanism for use in the open roof construction as described above.

BRIEF DESCRIPTION OF THE DRAWINGS

Aspects of the invention will be elucidated hereafter with reference to the drawings showing embodiments of the open roof construction.

DETAILED DESCRIPTION OF THE ILLUSTRATIVE EMBODIMENTS

Figure 1A:
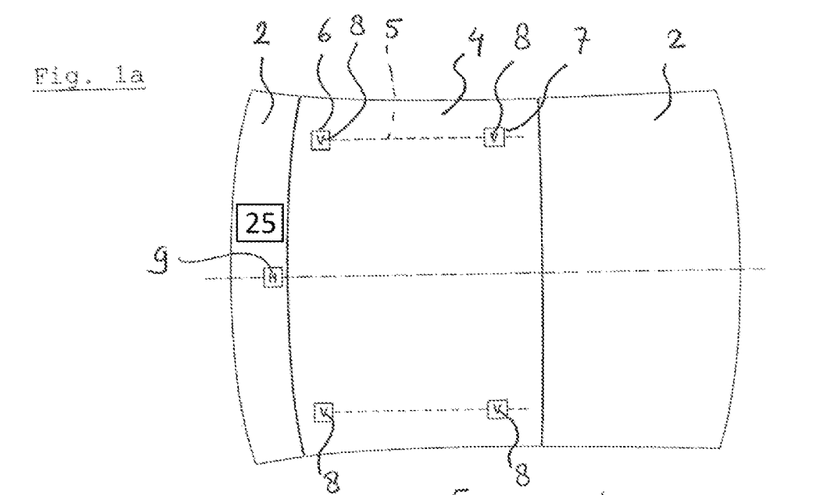
FIGS. 1a and 1b show a first embodiment of the open roof construction in very schematic plan view and in two different positions.
Figure 1B:
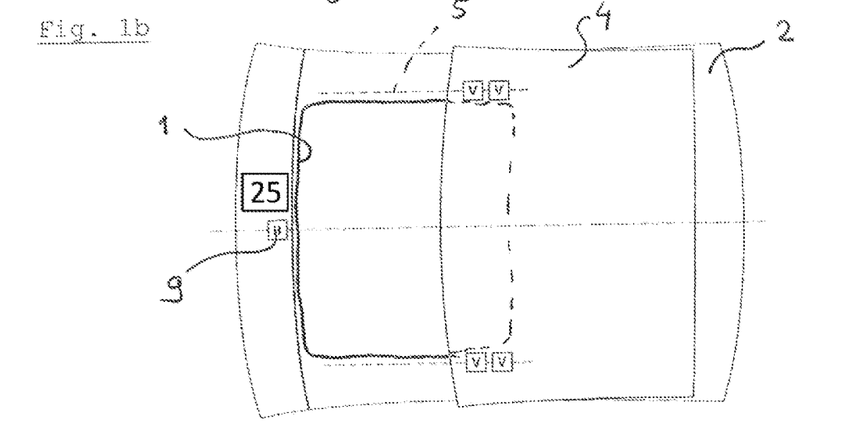
Figure 1C:
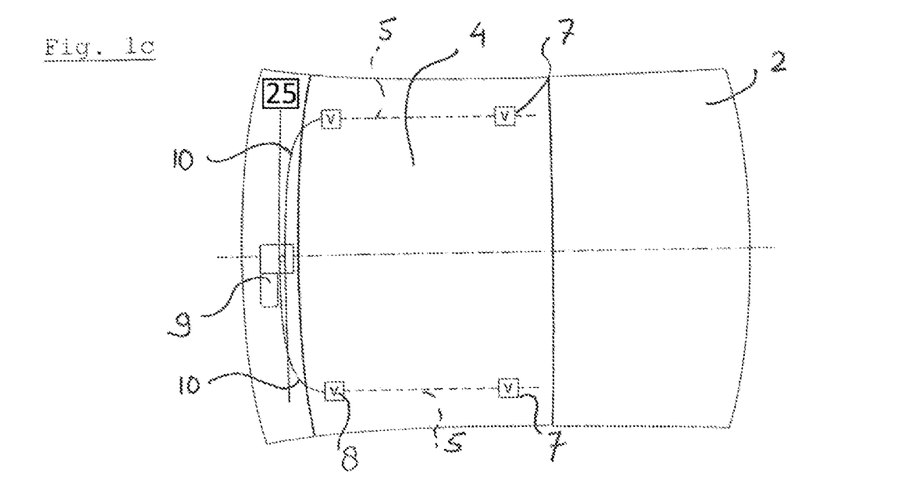
FIG. 1c is a view corresponding to that of FIG. 1a, but showing the drive source and connecting element in more detail.

The drawing, and in first instance FIG. 1a-1c show an open roof construction for a vehicle, in particular a motor vehicle such as a passenger car. As is shown in FIG. 1, this vehicle is provided with an opening 1 in its fixed roof 2, whereby it is noted that said fixed roof 2 may either form part of the vehicle or of the open roof construction itself, which in that case makes up the entire roof of the vehicle. The fixed roof 2 may consist of an integral part of the vehicle or of one or more (metal or transparent) panels, which may be fixed, removable or form a separate adjustable roof element.

The open roof construction includes a stationary part, such as a frame 3, and a closure element, in this case in the form of a rigid and preferably transparent panel 4, for example made of glass or of plastic material, which is movably supported by frame 3. In this embodiment, panel 4 is movable between a closed position, in which roof opening 1 is closed and panel 4 is at least substantially coplanar with fixed roof 2, and an open position, in which panel 4 occupies a rearward position, at least partially above the fixed roof 2 (or a second rigid panel, not shown), in which at least a part of opening 1 is cleared. In the embodiment shown, panel 4 is first tilted from the closed position (FIGS. 1a and 6a) to a venting position in which the rear edge of panel 4 is moved upwardly (FIG. 6b), and then moved rearwardly to positions above the fixed roof 2 (FIGS. 1b and 6c).

An operating mechanism is provided on each longitudinal side of panel 4 for effecting the movements of panel 4. In this case, the operating mechanism is supported by guide rails 5 extending substantially parallel in longitudinal direction of the vehicle and mounted alongside the roof opening 1. The operating mechanism includes on each guide rail 5 a first or front support member 6 supporting panel 4 near its front side and a second or rear support member 7 supporting panel 4 a distance behind front support member 6. Other concepts are conceivable as well, for example one including a single or double central guide rail (splitting the opening 2 in two half openings) carrying one or two front support members 6, and two lateral guide rails carrying the two rear support members 7. Still other variations are possible.

As mentioned, panel 4 is supported by four support members 6, 7, each supporting panel 4 in a corner thereof when panel 4 is in its closed position. In this spoiler-type of roof, rear support members 7 are fixed in horizontal direction, and are adjustable in vertical direction only. The front support members 6 are adjustable in horizontal and vertical direction. For vertical adjustment of front and rear support members 6, 7 they each comprise their own vertical drive source 8 indicated by V in the drawing. Front support members 6 are adjustable in horizontal direction by means of a common horizontal drive source 9, in the embodiment of FIG. 1c in the form of an electric motor controlled by a central controller and connected to both front support members 6 through connecting elements 10, here elongated flexible connecting members, such as push-and-pull cables engaged with an output gear of the electric motor. As is shown, the parts of the front support members 6 that cause the vertical adjustment of panel 4 are at least partly moving with panel 4 when it is driven by horizontal drive source. The support member 6, 7 includes the parts between panel 4 and guide rail 5 or stationary part 3.

Figures 6A, 6B, 6C:
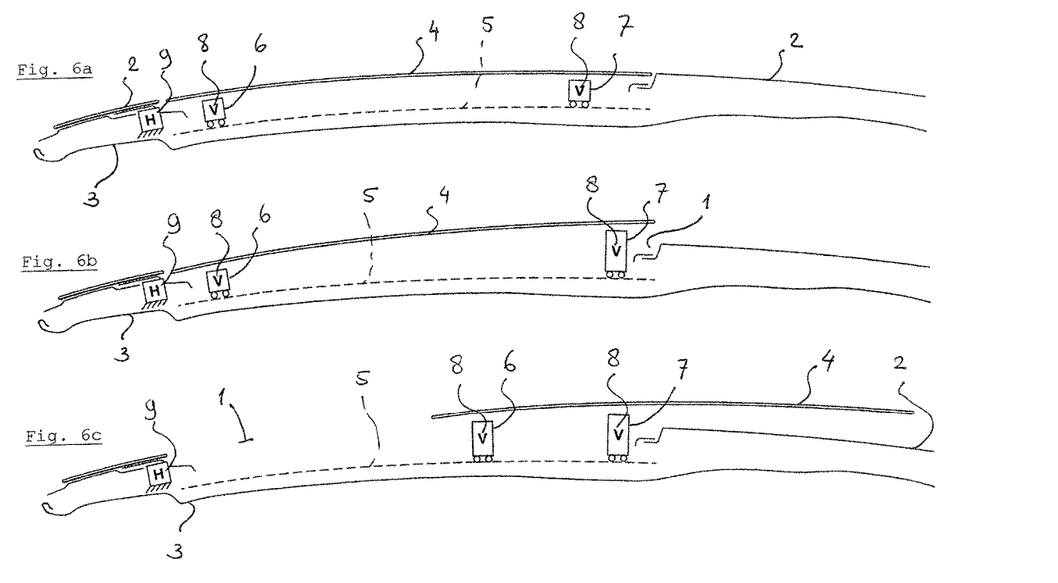
FIGS. 6a-6c and 7a-7c are very schematic side views of a sixth and the second embodiment of the open roof construction in three different positions.

The rear support members 7 are connected to panel 4 through a rail (not shown) such that, when front support members 6 move horizontally after rear support members 7 have lifted the rear side of panel 4 upwardly (FIG. 6b), panel 4 slides along rear support members 7 to a position in which a substantial part of roof opening 1 is opened (FIG. 6c). For making these movements, the front and rear support members 6, 7 are adjusted in vertical direction independently from each other and independently from the horizontal adjustment, so that panel 4 can be allowed to make all the movements that are desirable. For example, it is easy to adjust rear support members 7 in vertical direction when panel 4 is moved backwardly, so that panel 4 is positioned as close as possible to fixed roof 2 in rear positions.

When the open roof construction is mounted in another vehicle having a different roof shape, the vertical movement can be changed to adapt the open roof construction to the vehicle type without it being necessary to change the mechanical parts of the open roof construction. Only the software in a programmable controller 25 for the horizontal and vertical drive sources 8, 9 should be changed.

Figure 2A:
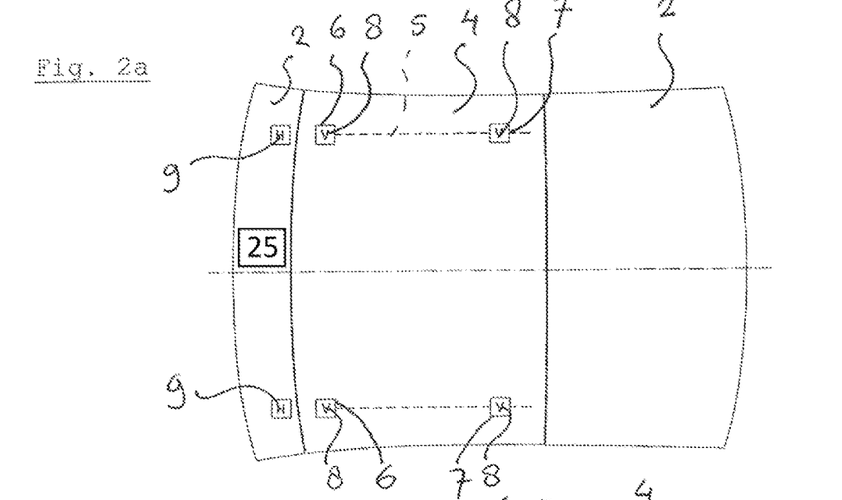
FIGS. 2a-2c, 3a-3c and 4a-4c are views corresponding to that of FIGS. 1a-1c, but showing a second, third and fourth embodiment of the open roof construction.
Figure 2B:
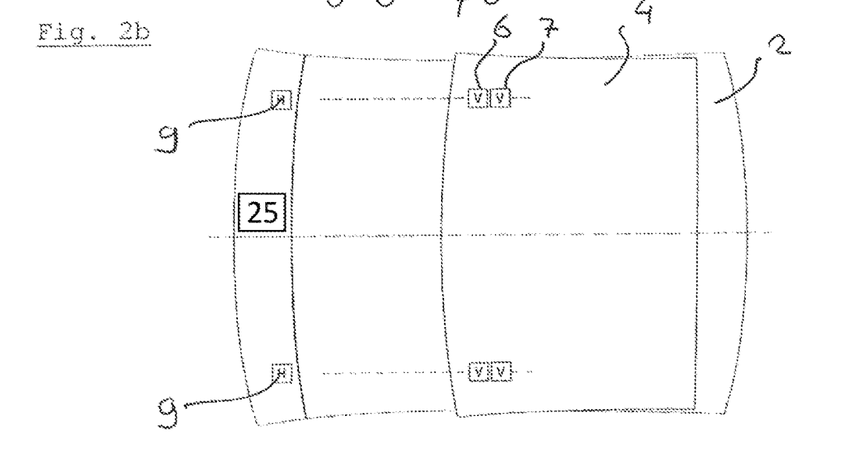
Figure 2C:
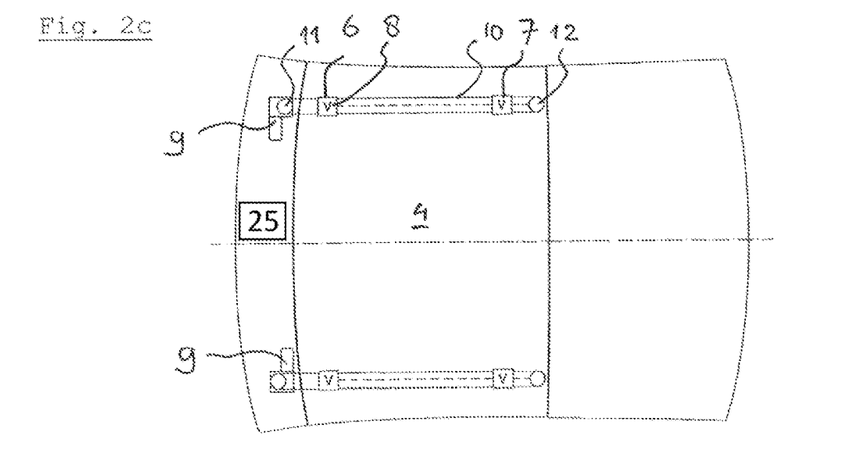
Figure 7A:
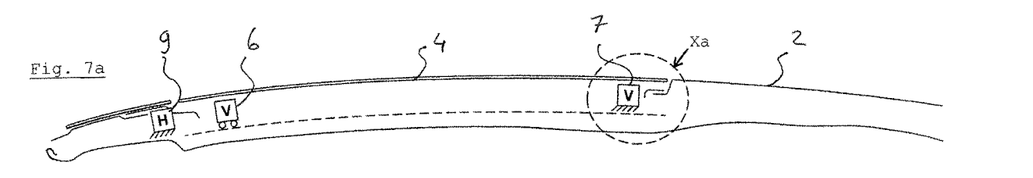
Figure 7B:
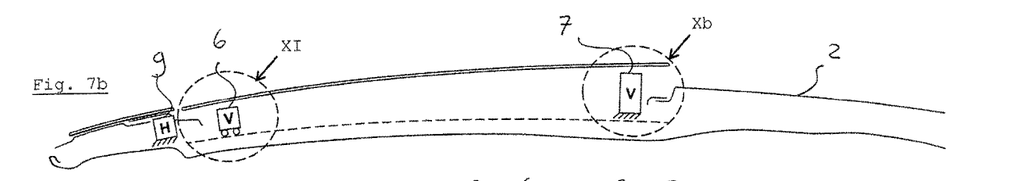
Figure 7C:
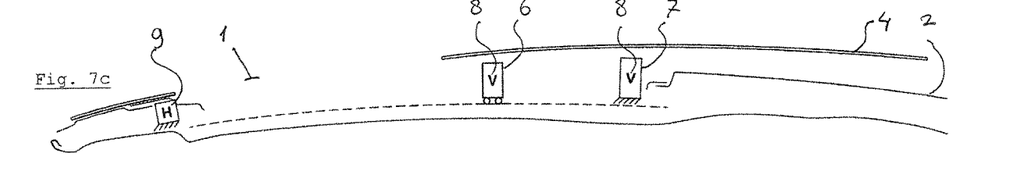

A second embodiment of the open roof construction, in particular of the operating mechanism thereof is shown in FIGS. 2 and 7. Again the same type of roof is shown. The main difference is that there are now two horizontal drive sources 9, one for each guide rail 5, and in particular one for each front support 6. Each stationary electric motor of horizontal drive source 9 is connected to the respective front support member 6 through a connecting element 10 in the form of a closed loop cable running around an electric motor wheel 11 and a return wheel 12, and one loop part being fixed to the front support 6.

Figure 3A:
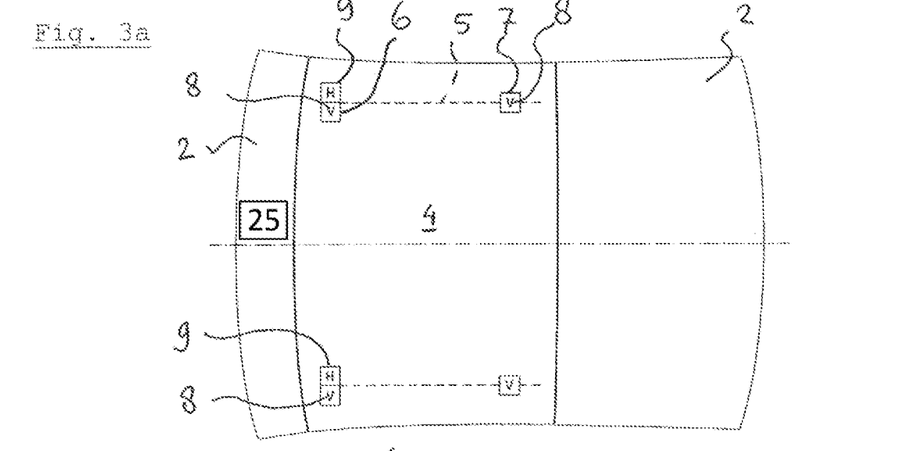
Figure 3B:
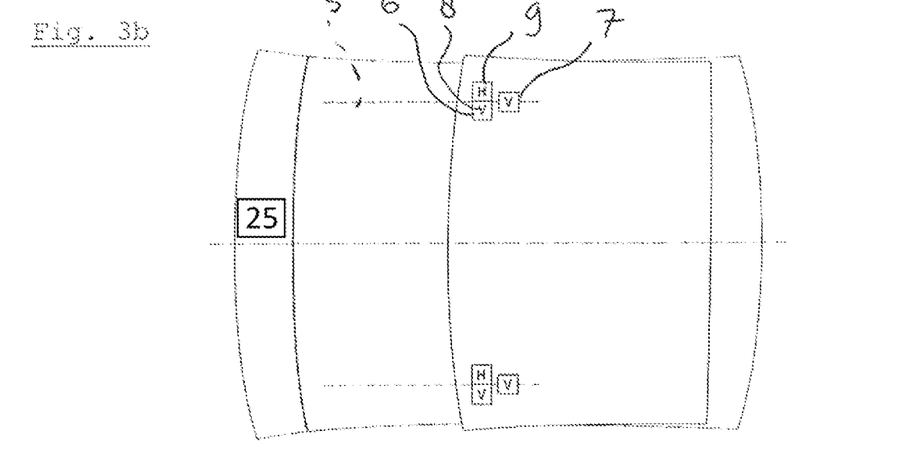
Figure 3C:
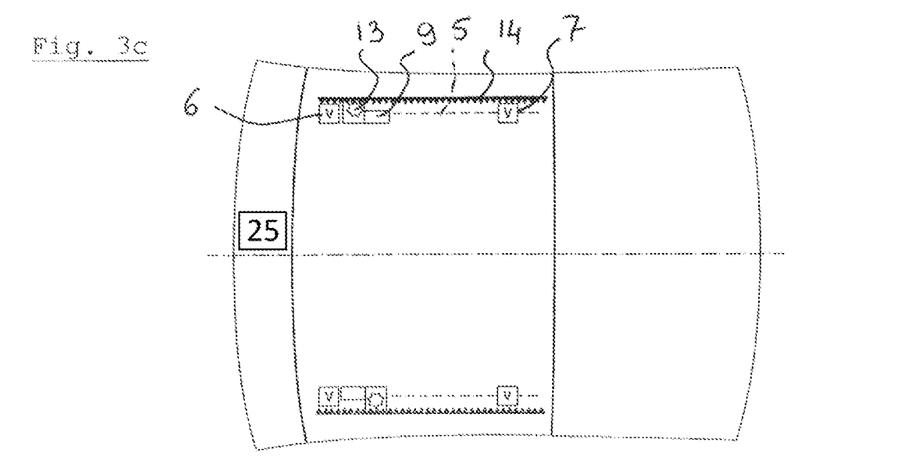

In the FIG. 3 embodiment, the electric motor of each horizontal drive source 9 is now moving along with respective front support member 6. For this purpose, each electric motor is provided with a pinion 13 engaged with a stationary toothed rack 14 fixed to respective guide rail 5.

Figure 4A:
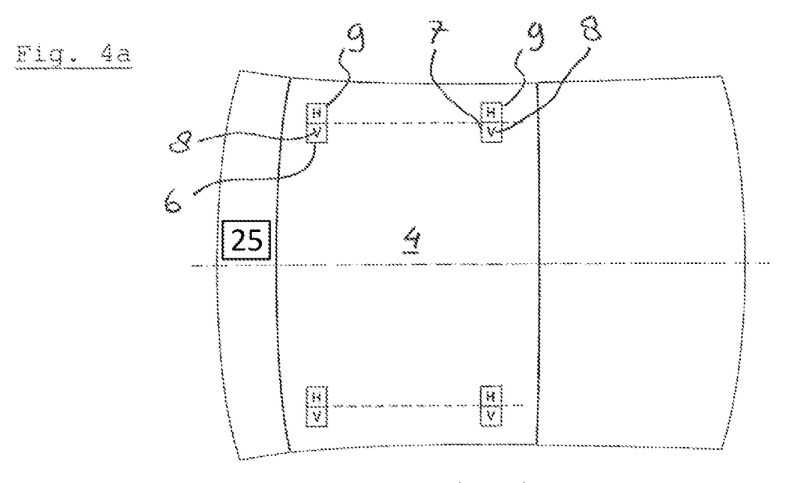
Figure 4B:
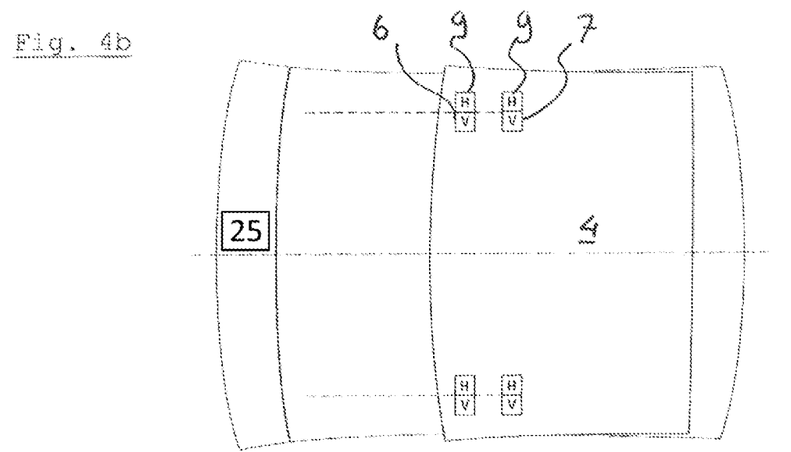
Figure 4C:
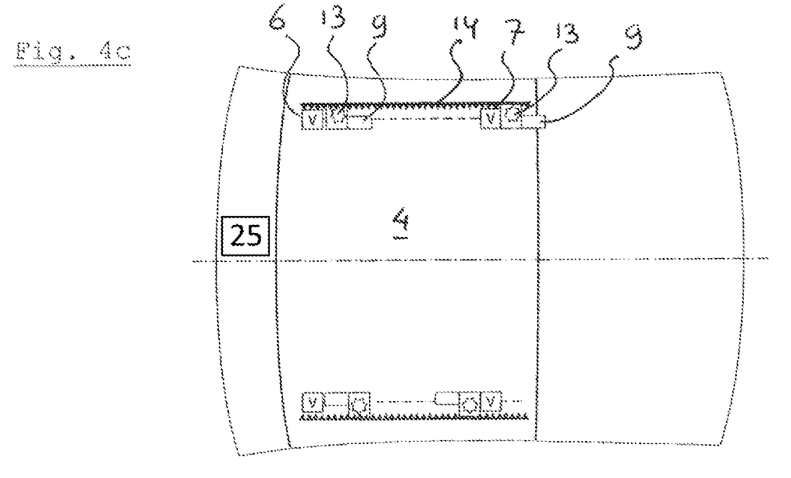

The embodiment of FIG. 4 is comparable to that of FIG. 3, but now rear support member 7 is also movable in horizontal direction, independently of the movements of front support member 6. For this purpose, each support member 6, 7 has its own horizontal and vertical drive source (so 8 in total), in which each horizontal drive source moves along with respective support member 6, 7.

Figure 5A:
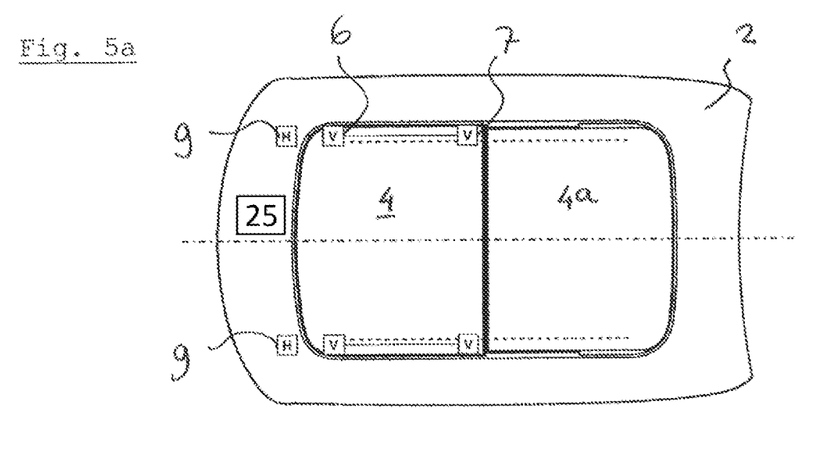
FIG. 5a, 5b are very schematic plan views of a top slider roof according to a fifth embodiment.
Figure 5B:
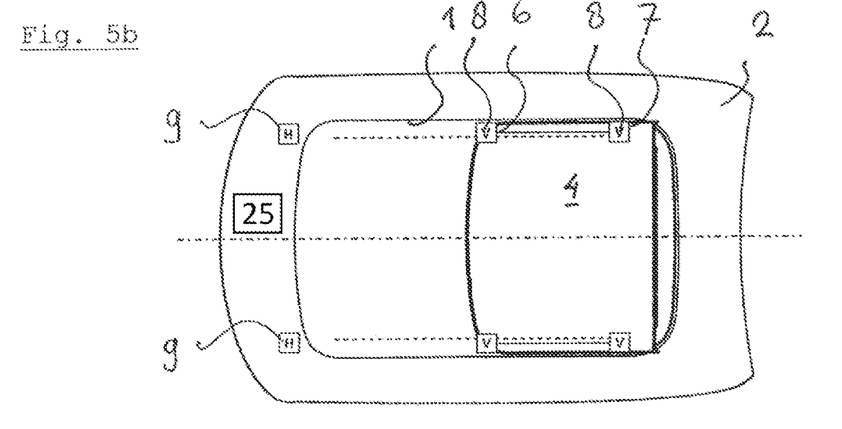

FIG. 5 shows an embodiment of the open roof construction in the form of a top slider in which a second panel 4a (mostly fixed) is mounted behind panel 4 when in closed position. Guide rails 5 are extended backwardly so that they also extend at the sides of rear panel 4a and at least the rear support members 7 may move rearwardly alongside rear panel 4a. In this embodiment, the first and second support members 6, 7 on each guide rail 5 have a common horizontal drive source 9 and thus slide together as a unit. The front and rear support members 6, 7 each have their own vertical drive source, so the vertical adjustment of the front and rear side of panel 4 is independent of the horizontal displacement, and in this case also independent of each other so that the vertical position of the panel 4 can be perfectly adjusted to the horizontal position of panel 4.

FIG. 6 shows in a side view a variation of the embodiment of FIG. 4. In the present embodiment, the front and rear support members 6, 7 have a common horizontal drive source 9, but this is coupled and uncoupled from the respective front and rear support member 6, 7 in order to drive it only when it is needed.

Figure 8A:
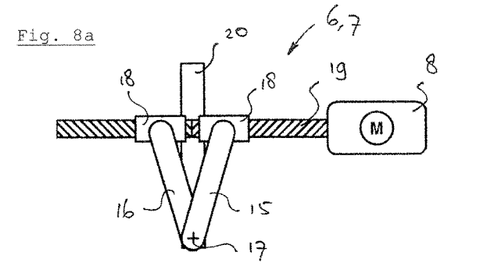
FIGS. 8a, 8b and 9a, 9b are enlarged side views of two embodiments of a support member in two different positions.
Figure 8B:
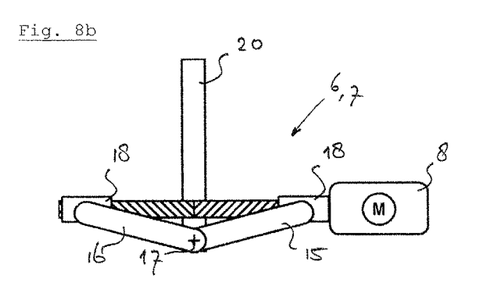
Figure 9A:
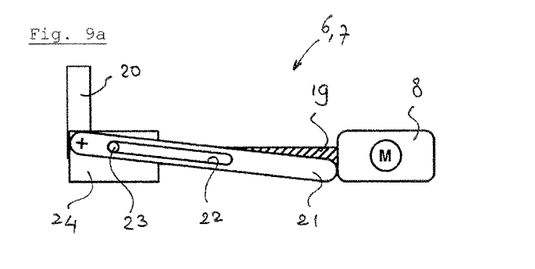
Figure 9B:
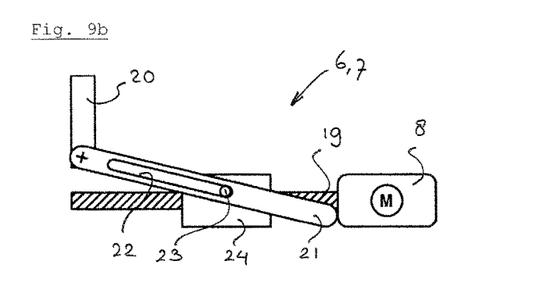

FIGS. 8 and 9 show two types of vertically adjustable support members 6, 7. The front and rear support members 6, 7 could be the same within one roof, but could also be made differently depending on the required vertical adjustment and the vertical space available for the support members 6, 7. The support member 6, 7 of FIG. 8 includes a set of levers 15, 16 connected at one end to each other through a pivot 17 and pivotally connected at their other end to a spindle bushing 18 engaged on a spindle shaft 19 rotatably driven by an electric motor of vertical drive source 8. A vertical support 20 is fixed to pivot 17. The spindle shaft 19 has opposite screw threads in order to horizontally move both bushings 18 in opposite directions when it rotates. Levers 15, 16 are then spread (FIG. 8b) or folded (FIG. 8a), thereby moving pivot 17 and vertical support 20 in vertical direction only. If a horizontal displacement of support 20 is required or desired, this can be accomplished by adapting the screw thread of spindle shaft 19 and bushings 18.

Figures 10A, 10B, 11:
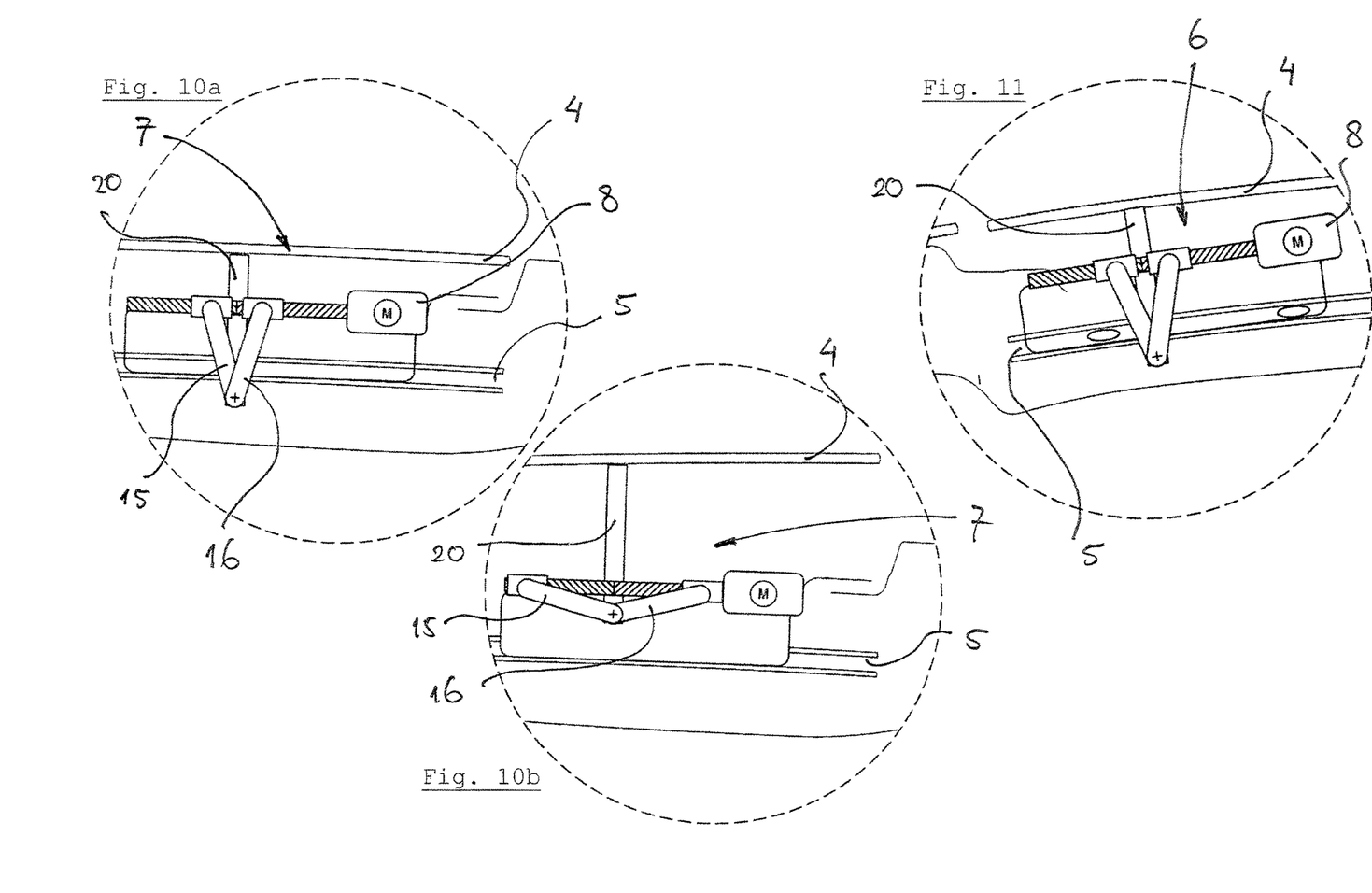
FIGS. 10a, 10b, 11 are enlarged details Xa, Xb, and XI in FIGS. 7a, 7b.

FIGS. 10a, 10 show a rear support member 7 comprising such vertical adjustment of FIG. 8. It is shown there that vertical support 20 is fixed to panel 4 so that it does not keep its vertical orientation, but is tilted with the tilting movement of panel 4. FIG. 11 shows support member 6 with such vertical adjustment.

FIG. 9 shows a different type of vertically adjustable support member 6, 7. Vertical support 20 is now pivotally connected to a free end of a single lever 21 which is pivoted by means of a pin-slot arrangement, comprising a longitudinal slot 22 (in this case straight, but could also be curved) in lever 21 and a pin 23 on a slide 24 which is in engagement with screw-threaded spindle shaft 19. Due to the orientation of slot 22, the pivotability of lever 21 and displacement of pin 23 with respect to the pivot point of lever 21, the latter will be tilted if pin 23 moves through slot 22. The free end of lever 21 will then move vertical support 20 up and down. All kinds of other arrangements for vertically (and horizontally) moving support members 6, 7 are conceivable of course.

From the foregoing it is clear that aspects of the invention provide an open roof construction for a vehicle and an operating mechanism for use therein which make it possible to optimize movements of the closure and to use the same operating mechanism for different types of roofs, by just reprogramming the software of the programmable controller 25. With the independent horizontal and vertical movements, it is possible to enable the closure to make movements that are not conceivable otherwise.

The invention is not limited to the embodiment shown in the drawing and described above which may be varied in different manners within the scope of the appended claims.

For example, it is possible to use the same front and rear support members for a so-called inslider type roof, in which the closure panel can be moved downwardly from its closed position in order to be moved rearwardly below the fixed roof. Other roof types and other closure elements, such as slats or multi panels are conceivable as well. The terms vertical and horizontal as used herein should be considered in a broad sense. It will depend on the orientation of guide rails 5 how the movement of the support members will be. Vertical means substantially perpendicular to the local orientation of the guide rail and horizontal means substantially parallel to the guide rail. The guide rails can be slightly curved so that the orientation of the support members will vary if they move along their guide rail.

The invention claimed is:

1. An open roof construction for a vehicle having a roof opening in a fixed roof, comprising a stationary part for attachment to the roof, carrying at least two guide rails alongside the roof opening, a closure having a front and a rear side and being supported by an operating mechanism guided by the guide rails, the closure being adjustable between a closed position, in which the closure closes the roof opening, and an open position in which the closure is at least partly moved out of the roof opening, wherein the operating mechanism comprises a pair of first support members and a pair of second support members supporting the closure on the guide rails, wherein each guide rail comprises one of the first support members adjustably supporting the closure on the guide rail, and one of the second support members adjustably supporting the closure a distance spaced apart from the associated first support member on the guide rail, and wherein each first support member of the pair of first support members is driven by a horizontal drive source to move the associated first support member horizontally and a separate vertical drive source to move the associated first support member vertically.

2. The open roof construction according to claim 1, wherein each support member of the pair of second support members comprises a second horizontal drive source move the associated second support member horizontally and a second separate vertical drive source to move the associated second support member vertically.

3. The open roof construction according to claim 1, wherein the horizontal drive source comprises a common drive source configured to adjust the first support members in the horizontal direction.

4. The open roof construction according to claim 1, wherein the horizontal drive source comprises a common drive source configured to adjust the first support members and the second support members in the horizontal direction.

5. The open roof construction according to claim 1, wherein each of the first and second support members includes one of a lever mechanism, a screw jack and a pin-slot mechanism.

6. The open roof construction according to claim 1, wherein the horizontal drive source comprises a separate horizontal drive source for each of the first and second support members that moves along with each of the first support members.

7. The open roof construction according to claim 1, wherein the horizontal drive source comprises a separate horizontal drive source fir each first support member and the associated second support member on each guide rail.

8. The open roof construction according to claim 1, wherein the horizontal drive source comprises one common drive source configured to adjust the first and second support members in a horizontal direction and wherein one or more connecting elements connect the one common drive source to all first and second support members to adjust the first and second support members in the horizontal direction.

9. The open roof construction according to claim 8, wherein the connecting elements include a belt, a push-pull cable, and/or a rack and pinion.

10. The open roof construction according to claim 1, wherein the drive sources are controlled by a programmable controller.

11. The open roof construction according to claim 1, wherein the vertical drive source for each of the second support members operates independent of a vertical position of either of the first support members.

12. The open roof construction according to claim 1, wherein the vertical drive sources for vertical adjustment of the first support members are movable in the horizontal direction.

13. The open roof construction according to claim 6, and wherein an additional horizontal drive source is provided for each of the second support members and moves along with each of the second support members.

14. An apparatus for use in an open roof construction for a vehicle having a roof opening in a fixed roof, comprising a stationary part for attachment to the roof, carrying at least two guide rails alongside the roof opening, a closure having a front and a rear side and being supported by an operating mechanism guided on the guide rails, the closure being adjustable between a closed position, in which the closure closes the roof opening, and an open position in which the closure is at least partly moved out of the roof opening, wherein the operating mechanism comprises on each guide rail an adjustable first support member adjustably supporting the closure near a front side thereof, and an adjustable second support member adjustably supporting the closure a distance behind the front side, and wherein each of the first support members and each of the second support members includes a vertical drive source to move the associated support member in a vertical direction and wherein at least one horizontal drive source moves the first support members in a horizontal direction.

15. The apparatus according to claim 14, wherein the at least one horizontal drive source comprises a common drive source configured to adjust the first support members in the horizontal direction.

16. The apparatus according to claim 15, wherein the vertical drive sources for vertical adjustment of the first support members are movable in a horizontal direction.

17. The apparatus according to claim 14, wherein the vertical drive sources for vertical adjustment of the first support members are movable in a horizontal direction.

18. The apparatus according to claim 14, wherein the vertical drive sources for vertical adjustment of the first support members and the second support members are movable in a horizontal direction.

19. The apparatus according to claim 18, wherein the at least one horizontal drive source comprises a common drive source configured to adjust the first support members and the second support members in the horizontal direction.

20. The apparatus according to claim 15, wherein the common drive source is stationary relative to horizontal movement of the first support members.

\* \* \* \* \*